US012142124B2

(12) United States Patent
Cianfrocco et al.

(10) Patent No.: US 12,142,124 B2
(45) Date of Patent: Nov. 12, 2024

(54) ISOLATED RECEIVER POWERED BY TRANSMITTER

(71) Applicant: Tyco Fire & Security GmbH, Neuhausen am Rheinfall (CH)

(72) Inventors: Daniel P. Cianfrocco, Clinton, MA (US); Alexandre Gouin, Sainte Basile le Grand (CA); Michael A. Furtado, Shrewsbury, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 10 days.

(21) Appl. No.: 18/149,785

(22) Filed: Jan. 4, 2023

(65) Prior Publication Data

US 2023/0215257 A1 Jul. 6, 2023

Related U.S. Application Data

(60) Provisional application No. 63/266,494, filed on Jan. 6, 2022.

(51) Int. Cl.
*G08B 17/06* (2006.01)

(52) U.S. Cl.
CPC .................................... *G08B 17/06* (2013.01)

(58) Field of Classification Search
CPC ........ G08B 17/06; G08B 25/06; G08B 25/10; H04L 12/10
See application file for complete search history.

(56) References Cited

U.S. PATENT DOCUMENTS

| | | | | |
|---|---|---|---|---|
| 10,090,666 B2 * | 10/2018 | Gardner | ................. | H02H 3/207 |
| 2016/0142217 A1 * | 5/2016 | Gardner | ................ | B60L 3/0069 307/1 |
| 2018/0276980 A1 * | 9/2018 | Yukizane | ............... | G08B 17/10 |
| 2021/0036897 A1 * | 2/2021 | Gardner | .................... | H04B 3/30 |
| 2021/0104953 A1 * | 4/2021 | Gardner | ................ | H02M 7/219 |

FOREIGN PATENT DOCUMENTS

WO WO-2012049548 A1 * 4/2012 ........... G08B 25/009

OTHER PUBLICATIONS

International Search Report and Written Opinion in PCT/US2023/060087, mailed May 4, 2023, 15 pages.

* cited by examiner

*Primary Examiner* — Hoi C Lau
(74) *Attorney, Agent, or Firm* — ARENTFOX SCHIFF LLP

(57) ABSTRACT

A fire protection system includes a first transceiver communicatively coupled with a first end of a communication link; a second transceiver communicatively coupled with a second end of the communication link and configured for communicating a signal with the first transceiver via the communication link; a first coupling/decoupling circuit configured to provide overlayed power by overlaying power from a first power source onto the signal at the first end of the communication link; and a second coupling/decoupling circuit configured to provide separated power by separating the signal from the overlayed power at the second end of the communication link, wherein the separated power is configured to power the second transceiver.

21 Claims, 6 Drawing Sheets

ISOLATED RECEIVER POWERED BY TRANSMITTER

CROSS REFERENCE TO RELATED APPLICATION(S)

This application claims the benefit of U.S. Provisional Application Ser. No. 63/266,494, entitled "ISOLATED RECEIVER POWERED BY TRANSMITTER" and filed on Jan. 6, 2022, which is expressly incorporated by reference herein in the entirety.

FIELD

The present disclosure relates generally to fire protection systems, and more particularly, to providing power in fire protection systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a fire protection system includes a first transceiver communicatively coupled with a first end of a communication link. The fire protection system further includes a second transceiver communicatively coupled with a second end of the communication link and configured for communicating a signal with the first transceiver via the communication link. The fire protection system further includes a first coupling/decoupling circuit configured to provide overlayed power by overlaying power from a first power source onto the signal at the first end of the communication link. The fire protection system further includes a second coupling/decoupling circuit configured to provide separated power by separating the signal from the overlayed power at the second end of the communication link, wherein the separated power is configured to power the second transceiver.

In a further aspect, an apparatus in a fire protection system includes a first transceiver communicatively coupled with a first end of a communication link and configured to communicate a signal with a second transceiver coupled with a second end of the communication link. The apparatus further includes a coupling/decoupling circuit configured to provide overlayed power by overlaying power from a first power source onto the signal at the first end of the communication link, wherein the overlayed power is configured to power the second transceiver at the second end of the communication link.

In another aspect, an apparatus in a fire protection system includes a first transceiver communicatively coupled with a first end of a communication link and configured to communicate a signal with a second transceiver communicatively coupled with a second end of the communication link. The apparatus further includes a coupling/decoupling circuit configured to provide separated power by separating the signal from power overlayed onto the communication link, wherein the separated power is configured to power the first transceiver.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a fire protection system in which a first transceiver provides power to a second isolated transceiver by overlaying power onto a communication link that is used to communicate signals between the first transceiver and the second transceiver. By isolating the second transceiver and powering the second transceiver with the overlayed power, the present aspects protect the communicated signals against interference and/or ground voltage mismatch, without requiring an isolated direct current (DC)-to-DC converter for powering the second transceiver.

Turning now to the figures, example aspects are depicted with reference to one or more components described herein, where components in dashed lines may be optional.

Figure 1:
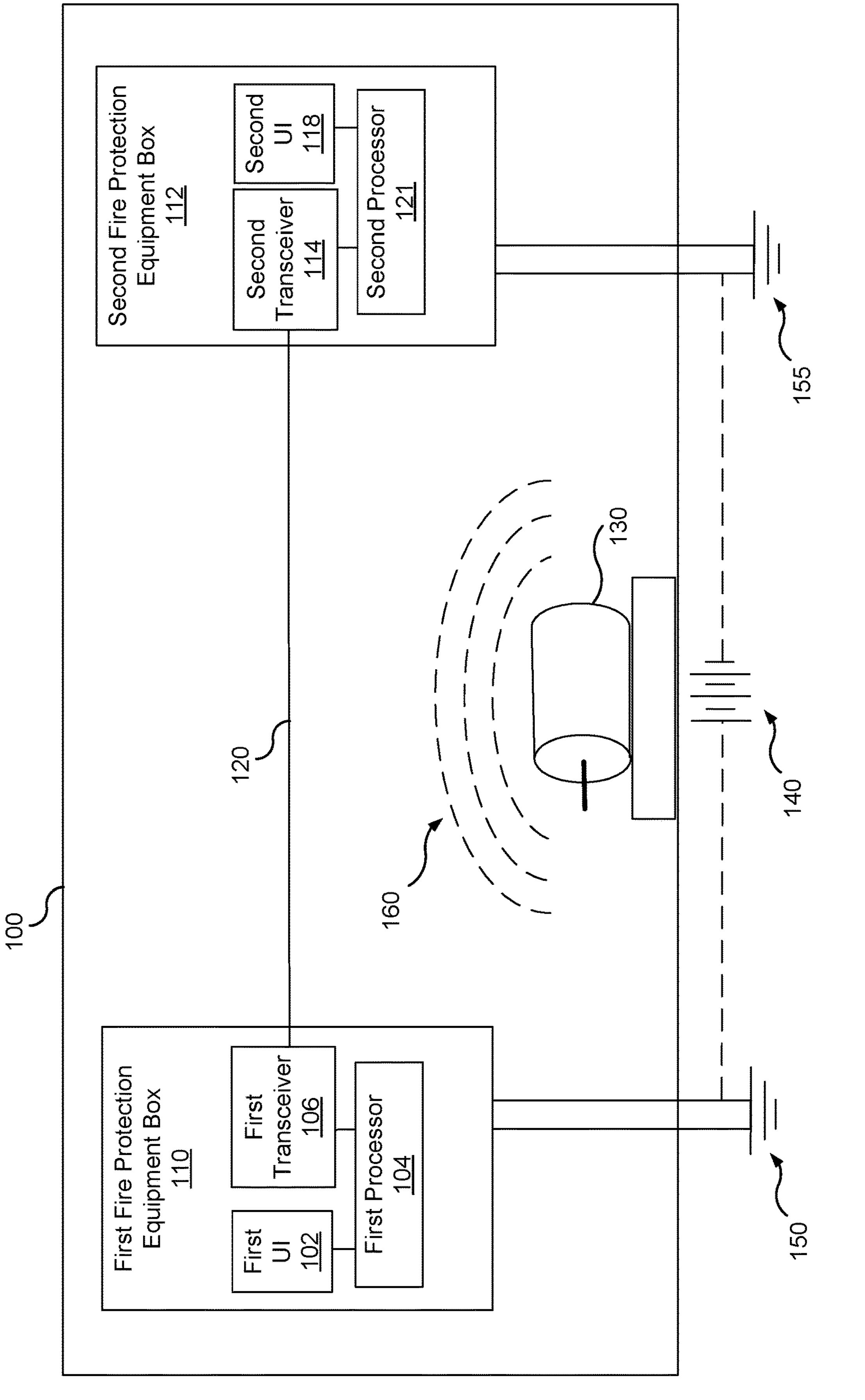
FIG. 1 is a schematic diagram of a fire protection system including two fire protection equipment boxes that communicate with each other, according to an aspect of the present disclosure.

Referring to FIG. 1, in some non-limiting example aspects, building automation equipment, such as a first fire protection equipment box 110 and a second fire protection equipment box 112, may be installed throughout a building 100 (or other structure). The first fire protection equipment box 110 and the second fire protection equipment box 112 may be adjacent to each other within the building 100, or may be distanced/separated across the building 100. Each one of the first fire protection equipment box 110 and the second fire protection equipment box 112 may be a fire alarm control panel. The first fire protection equipment box 110 may include a first user interface (UI) 102 communicatively coupled with a first processor 104. Similarly, the second fire protection equipment box 112 may include a second UI 118 communicatively coupled with a second processor 121.

In some aspects, the first fire protection equipment box 110 and the second fire protection equipment box 112 may communicate with each other via a wired communication link 120. Specifically, for example, a first transceiver 106 in the first fire protection equipment box 110 may be communicatively coupled with the first processor 104, and a second transceiver 114 in the second fire protection equipment box 112 may be communicatively coupled with the second processor 121. Further, the first transceiver 106 and the second transceiver 114 are communicatively coupled via the communication link 120 and thereby provide a communication path between the first processor 104 and the second processor 121.

In some cases, challenges may arise from the differences between the connected systems, namely, the first fire protection equipment box 110 and the second fire protection equipment box 112. Specifically, regarding the voltage of "Earth" which is taken as the 0V reference, there may be factors that produce a difference between two points of "Earth" across the scale of the building 100. For example, an electric motor 130 in the building 100, such as a large heating, ventilation, and air conditioning (HVAC) motor, an industrial electric motor, etc., may induce electricity onto surrounding metal and cause undesirable interference onto the signals communicated between the first fire protection equipment box 110 and the second fire protection equipment box 112 via the communication link 120.

These issues are exacerbated when the operating frequency/bandwidth of the signals communicated between the first fire protection equipment box 110 and the second fire protection equipment box 112 via the communication link 120 is high (e.g., greater than 1 Mbps), for example, in case of digital audio communication via the communication link 120. In particular, for example, as compared to communicating lower frequency signals (e.g., less than 10 kbps) via the communication link 120, communicating higher frequency signals via the communication link 120 is more sensitive to disruption/electromagnetic interference even when the first fire protection equipment box 110 and the second fire protection equipment box 112 are close to each other. The higher the data speed in a communication link, the more sensitive the communication link 120 is to interference at short distances.

For example, the electric motor 130 may emit electromagnetic noise 160, and may induce a difference in ground potential associated with the first fire protection equipment box 110 and the second fire protection equipment box 112. This difference in ground potential may be modeled as a battery 140 in between a first earth potential 150 of the first fire protection equipment box 110 and a second earth potential 155 of the second fire protection equipment box 112.

Some systems mitigate these challenges by isolating the signal along the communication link 120 using isolation and differential signaling. Isolation interrupts the interference caused by differences in power supplies or by radiofrequency (RF) noise (e.g., electromagnetic noise 160) induced in long wires. Differential signaling is a method of encoding digital information on a single pair of wires such that each wire takes turns being of opposite voltage values around a central voltage point/potential. Cycling the voltage values around the central voltage point/potential and detecting the voltage value crossings may make the wires more immune to interference and may also reduce the impact of wiring losses. The RS-485 standard is one example standard that utilizes this technique.

The aforementioned interference and ground potential mismatch challenges are compounded in fire protection systems due to a regulation requirement to detect wiring faults between a circuit and "Earth." Earth in this context is the ground potential, and represents the voltage of surrounding building steel, metal conduit, steel enclosures, metal junction boxes, etc. When fire alarm wiring becomes damaged or is installed improperly, the wiring may come into contact with these structural metals, and the fire protection system is required to be able to detect these single point faults and notify the technician/building owner of a potential issue. Because of this requirement to be able to sense wiring faults, fire alarm wiring cannot be completely isolated.

Additionally, high speed isolators (such as, for example, ISO721D from Texas Instruments) require power on both sides of the isolation barrier, which may require a dedicated power converter at each isolator that is large and expensive. For example, referring to FIG. 2, some fire protection systems provide isolation by including a first DC-to-DC converter 206 and a first isolator 204 at the first fire protection equipment box 110 to isolate the first transceiver 106, and similarly including a second DC-to-DC converter 210 and a second isolator 208 at the second fire protection equipment box 112 to isolate the second transceiver 114. However, such DC-to-DC converters may be large and expensive.

Some aspects of the present disclosure provide a lower cost solution to the aforementioned interference and ground potential mismatch issues by sending power across the data lines while also providing the required fire alarm wiring fault detection. In some aspects, for example, by implementing Power-over-Data-Lines (PoDL) techniques, one side of a building interconnection (e.g., the first fire protection equipment box 110) may perform the earth fault detection as well as provide the power to run an isolator on the other side (e.g., the second fire protection equipment box 112). The isolator may include, for example, a transformer with feedback and regulation. PoDL is a technique that biases a differential signal with a DC offset that carries power.

In some cases, implementing PoDL techniques may require very large components to decouple the power from the high-speed data (and the components may get larger with more power demand). Further, the data is required to be balanced (e.g., the data cannot have too many 1's or 0's in a row), and the power drawn is required to be very constant so as to not distort the data. However, in the present aspects, the requirements of PoDL are mitigated and PoDL is leveraged for providing a path for earth fault detection.

Figure 3:
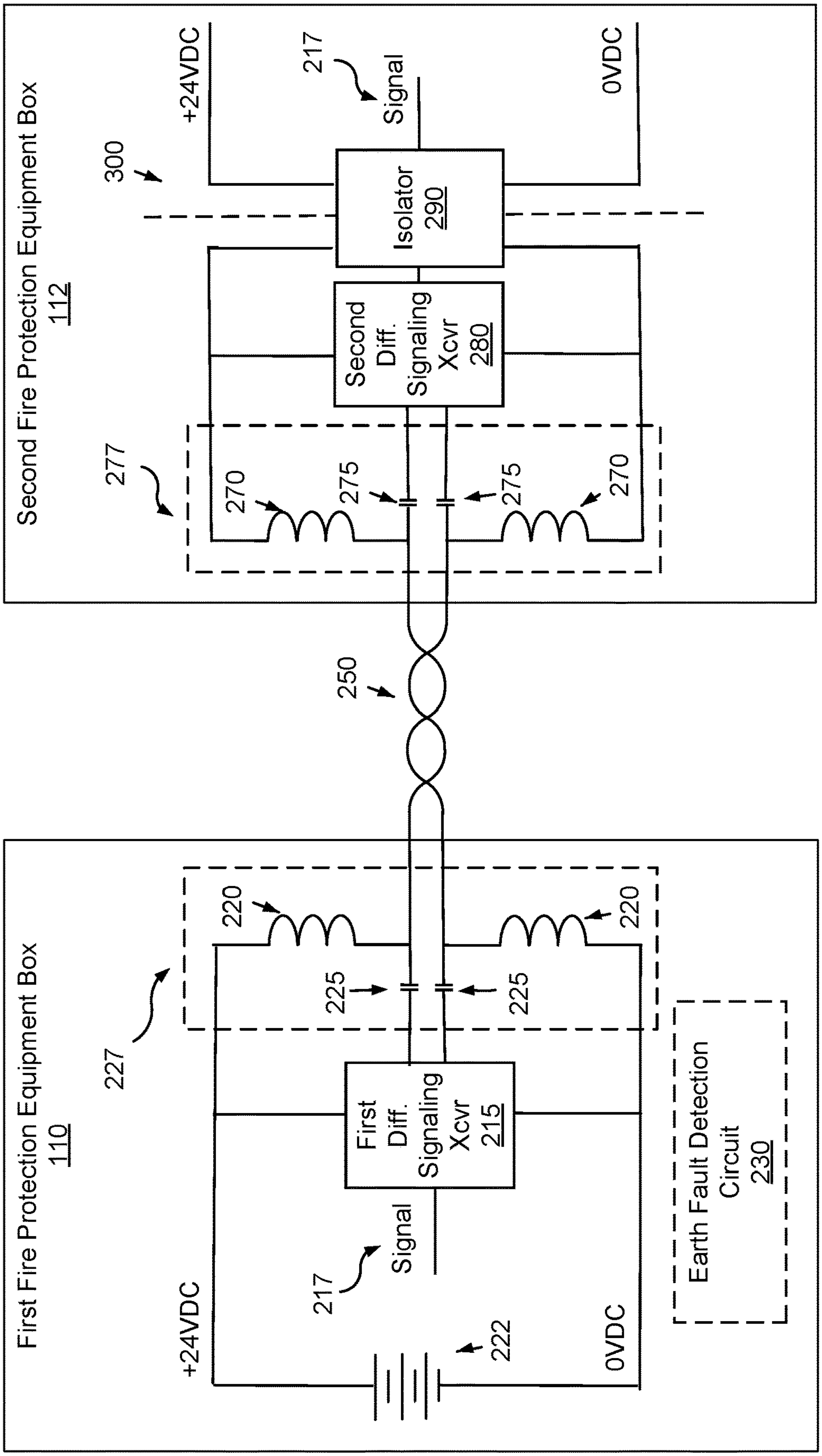
FIG. 3 is a schematic diagram of a fire protection system in which a first transceiver powers a second isolated transceiver via a Power-over-Data-Lines (PoDL) link, according to an aspect of the present disclosure.

Referring to FIG. 3, in some non-limiting example aspects, the first fire protection equipment box 110 and the second fire protection equipment box 112 may include a first differential signaling transceiver 215 and a second differential signaling transceiver 280, respectively, in order to implement differential signaling (according to, for example, the RS-485 standard) as the basic communication layer for communicating a signal 217 over field wiring 250 that connects the first fire protection equipment box 110 with the second fire protection equipment box 112.

In some non-limiting example aspects, each one of the first differential signaling transceiver 215 and the second differential signaling transceiver 280 may include an RS-485 transceiver. The RS-485 is a differential signaling encoding system. In some non-limiting example aspects, the output pins of an RS-485 transceiver (such as, for example, LTC 485 from Linear Technology) may flip between two states, such as but not limited to +2.5V and −2.5V.

In FIG. 3, the first differential signaling transceiver 215 and the second differential signaling transceiver 280 are in bidirectional signal communication with each other over the field wiring 250. Also, additional components (225, 220, 270, 275, as described in further detail below) are implemented in the first fire protection equipment box 110 and the second fire protection equipment box 112 such that the field wiring 250 delivers power from a DC power supply 222 in the first fire protection equipment box 110 to the second differential signaling transceiver 280 in the second fire protection equipment box 112. Accordingly, in terms of power delivery, the first fire protection equipment box 110 is a "source" and the second fire protection equipment box 112 is a "destination," while the signal 217 which is communicated over the field wiring 250 may flow in the same direction, or counter to, the direction of power delivery.

Figure 4:
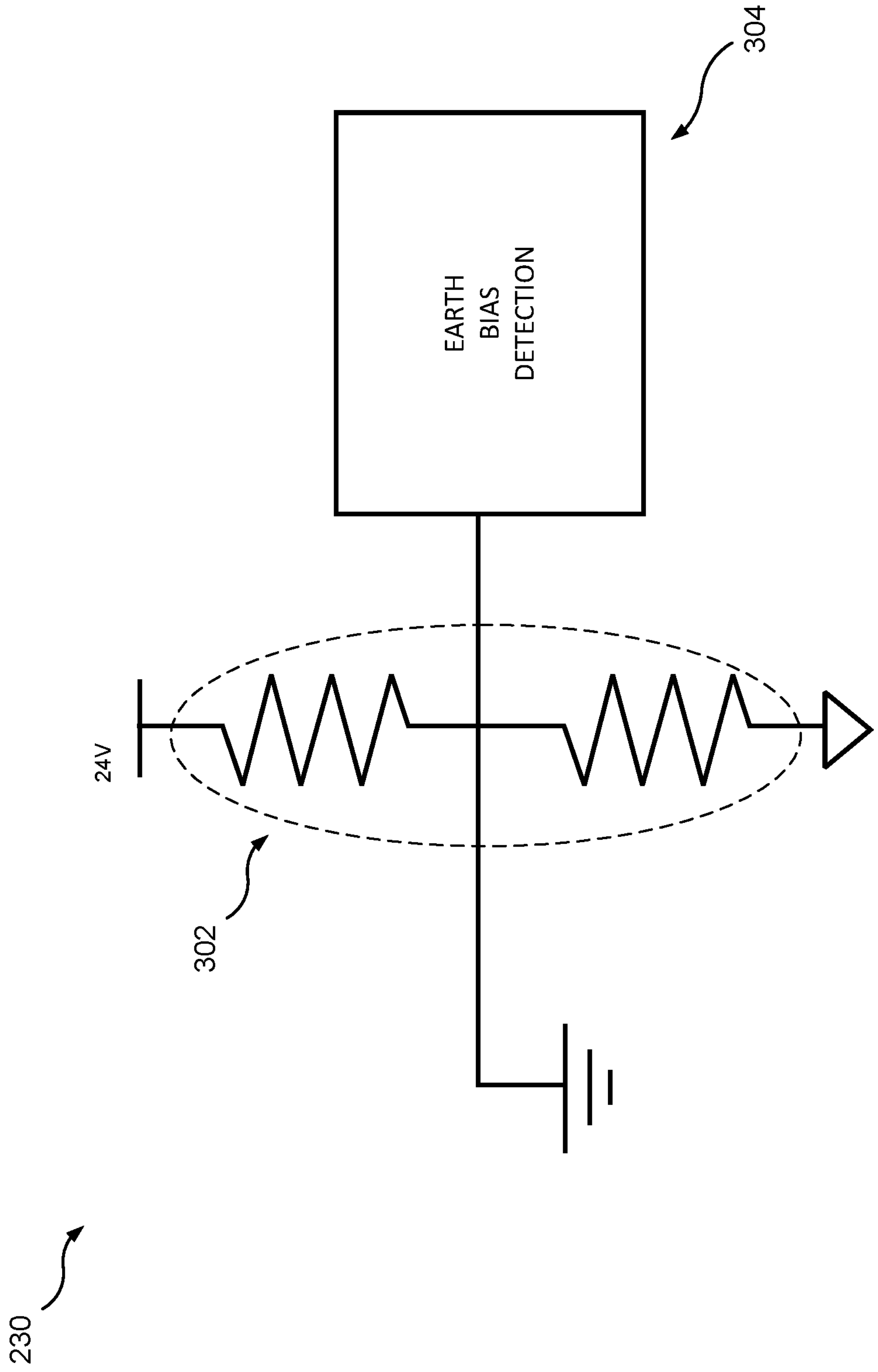
FIG. 4 is a schematic diagram of the earth fault detection system in the fire protection system of FIG. 3, according to an aspect of the present disclosure.

In some non-limiting example aspects, the first fire protection equipment box 110 includes an earth fault detection circuit 230. In some non-limiting example aspects, Earth fault detection is accomplished by weakly forcing the "Earth" reference potential to an intermediate voltage (e.g., via resistors 302 in FIG. 4). In some non-limiting aspects, for example, the intermediate voltage may be 10 VDC. When a wiring fault shorts the field wiring 250 to earth (e.g., when a stray wire strand of the field wiring 250 comes into contact with an earthed conduit), this new earth fault short overrides the weak intermediate voltage. The earth fault detection circuit 230 senses this change in the Earth voltage (e.g., via an earth bias detection circuit 304 which may be implemented using, for example, one or more comparators) and provides a notification indicating that there is an issue.

In some non-limiting example aspects, the second fire protection equipment box 112 includes an isolator 290 that provides a signal and power isolation barrier 300 between the second RS 485 transceiver 280 and other components in the second fire protection equipment box 112. The isolator 290 is powered by the power overlayed onto the field wiring 250. Accordingly, in these aspects, there is no need for a DC-to-DC power converter at the second fire protection equipment box 112 for providing power to the isolator 290.

In some non-limiting example aspects, in the first fire protection equipment box 110, the first differential signaling transceiver 215 is capacitively coupled via capacitors 225 to the field wiring 250. In some non-limiting example aspects, the field wiring 250 may be a copper wiring pair which is twisted to mitigate common interference that applies to both wires. Each of the capacitors 225 may be, for example, 1 micro Farad. The conductors in the field wiring 250 are also connected to +24 VDC and OVDC through inductors 220. Each of the inductors 220 may be, for example, 1 milli Henry. This capacitively-coupled data and inductively-coupled power is thus provided by a first PoDL circuit 227 comprising the capacitors 225 and the inductors 220.

In some non-limiting example aspects, in the second fire protection equipment box 112, capacitors 275 and inductors 270 similarly provide a second PoDL circuit 277 and may have the same or similar values as respective ones of the capacitors 225 and the inductors 220 at the first fire protection equipment box 110. Accordingly, the capacitors 275 and the inductors 270 comprising the second PoDL circuit 277 separate the DC power on the field wiring 250 from the differentially-signaled data on the field wiring 250. This separated DC power may then be filtered and regulated to smooth out changes in load, and powers the second Differential signaling transceiver 280 and an isolator 290 that establishes a signal and power isolation barrier 300 to isolate the signal 217 in the second fire protection equipment box 112.

In some non-limiting example aspects, at the data layer, the raw data in the signal 217 is encoded so as to have balanced DC polarity. This may be accomplished, for example, using Manchester encoding or more advanced algorithms such as 8b/10b encoding. This ensures that there are not too many sequential 1's or 0's that interact with the PoDL components to cause errors.

Figure 2:
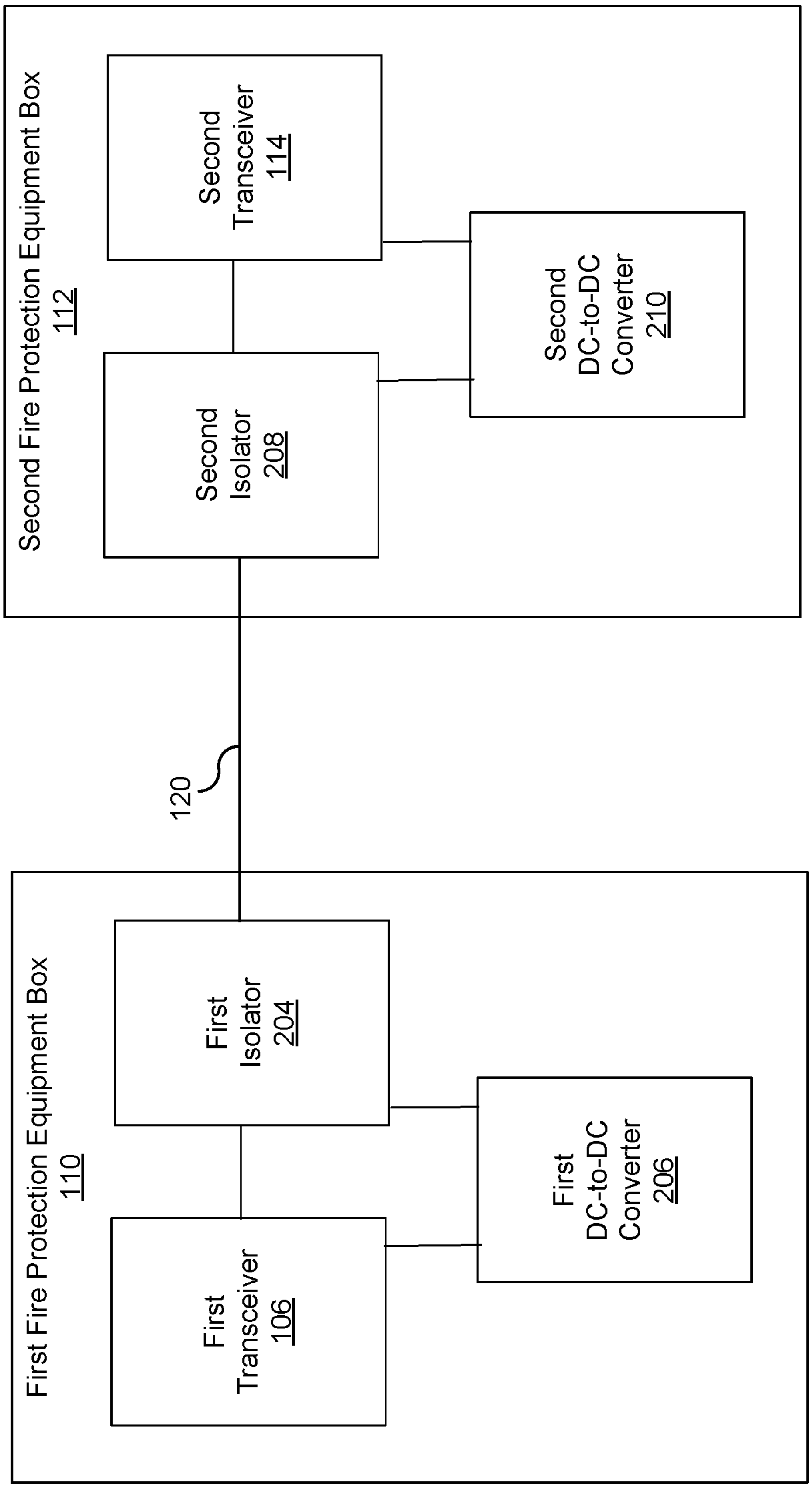
FIG. 2 is a schematic diagram of a fire protection system including two fire protection equipment boxes that each include an isolator and a direct current (DC)-to-DC converter, according to an aspect of the present disclosure.

By implementing the first PoDL circuit 227, the second PoDL circuit 277, and balanced data encoding, the present aspects utilize PoDL to replace the second DC-to-DC converter 210 in FIG. 2. The coupling/decoupling components in the second PoDL circuit 277 in the second fire protection equipment box 112 in FIG. 3 are smaller and lower cost than the second DC-to-DC converter 210 that provided the same functionality in FIG. 2.

Figure 5:
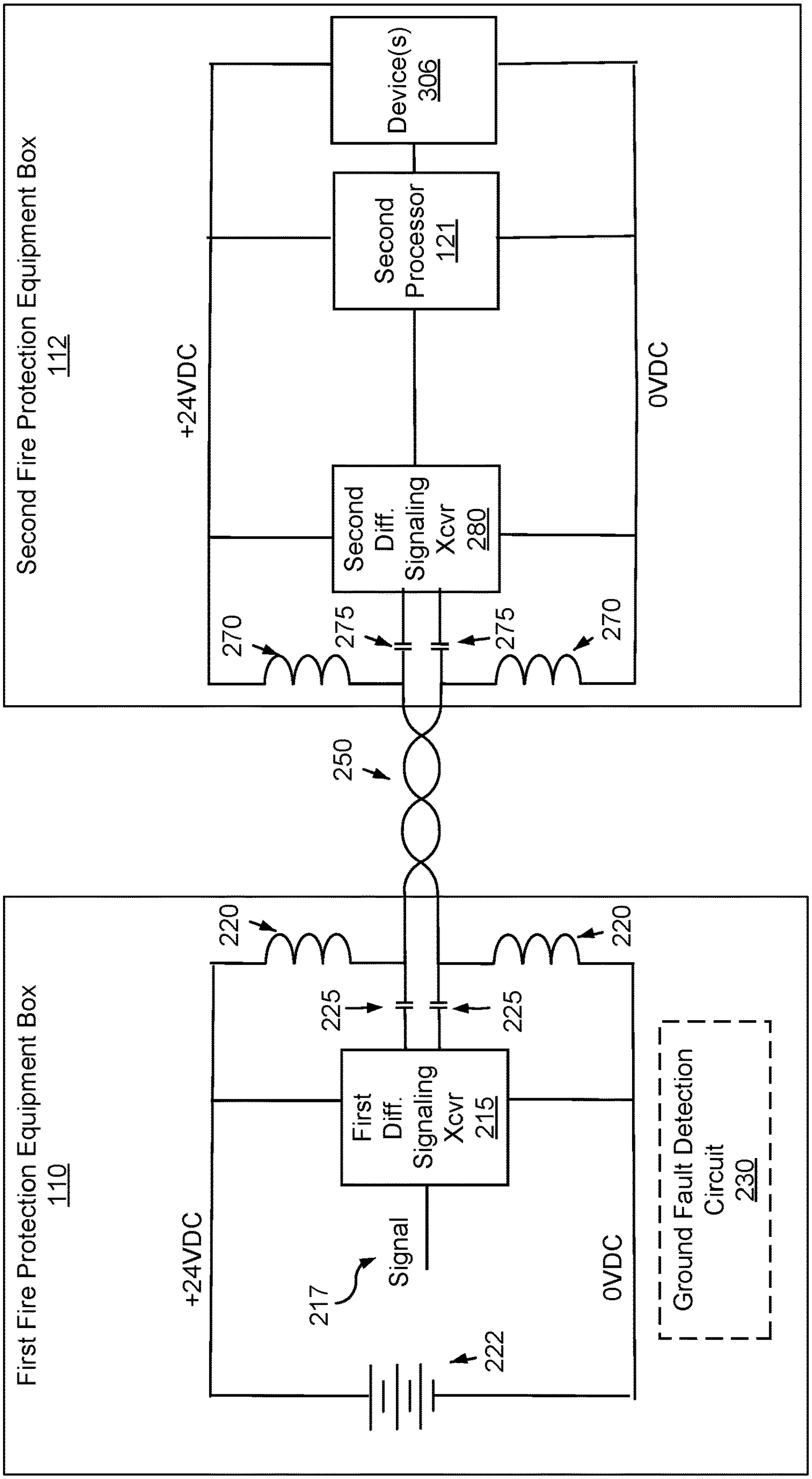
FIG. 5 is a schematic diagram of a fire protection system in which a first transceiver powers a second isolated transceiver and one or more other devices associated with the second transceiver, according to an aspect of the present disclosure.

Referring to FIG. 5, in some alternative non-limiting example aspects, the power overlayed onto the field wiring 250 may be used at the second fire protection equipment box 112 to source power to the second processor 121 as well as one or more additional devices 306 controlled by the second processor 121 in the second fire protection equipment box 112. For example, in some non-limiting example aspects, the capacitors 275 and the inductors 270 at the second fire protection equipment box 112 separate the DC power on the field wiring 250 from the differentially-signaled data on the field wiring 250. This separated DC power may then be filtered and regulated to smooth out changes in load, and powers the second differential signaling transceiver 280, the second processor 121, and the devices 306 that are controlled by the second processor 121.

In some non-limiting example aspects, the devices 306 may include one or more initiating devices and/or one or more notification devices, such as, but not limited to, a strobe, a self-amplified speaker, an emergency signage, a smoke detector, a sounder, etc. Accordingly, there is no need for a power source at the second fire protection equipment box 112 to provide power to the processor 121 and the devices 306.

Some further aspects are provided below.

1. A fire protection system comprising:

a first transceiver communicatively coupled with a first end of a communication link;

a second transceiver communicatively coupled with a second end of the communication link and configured for communicating a signal with the first transceiver via the communication link;

a first coupling/decoupling circuit configured to provide overlayed power by overlaying power from a first power source onto the signal at the first end of the communication link; and a second coupling/decoupling circuit configured to provide separated power by separating the signal from the overlayed power at the second end of the communication link, wherein the separated power is configured to power the second transceiver.

2. The fire protection system of clause 1, wherein the first coupling/decoupling circuit is configured to capacitively couple a signal port of the first transceiver to the communication link, and wherein the first coupling/decoupling circuit is configured to inductively couple the first power source to the communication link.

3. The fire protection system of clause 1 or 2, wherein the second coupling/decoupling circuit is configured to capacitively decouple a signal port of the second transceiver from the communication link, and wherein the second coupling/decoupling circuit is configured to inductively decouple the separated power from the communication link.

4. The fire protection system of any one of the above clauses, further comprising an isolator communicatively coupled with the second transceiver and configured for communicating the signal with the second transceiver.

5. The fire protection system of clause 4, wherein the isolator comprises a first side and a second side, and wherein the isolator is configured to provide an isolation barrier between the first side and the second side.

6. The fire protection system of clause 5, wherein the first side of the isolator is communicatively coupled with the second transceiver, and wherein the second side of the isolator is communicatively coupled with a processor.

7. The fire protection system of clause 5 or 6, wherein the separated power is configured to power the first side of the isolator.

8. The fire protection system of clause 6 or 7, wherein a second power source is configured to power the processor and the second side of the isolator.

9. The fire protection system of any one of clauses 1 to 3, wherein the second transceiver is communicatively coupled with a processor, and wherein the separated power is further configured to power the processor.

10. The fire protection system of clause 9, wherein the separated power is further configured to power one or more devices that are controlled by the processor.

11. The fire protection system of clause 10, wherein the one or more devices comprise one or more fire protection devices.

12. The fire protection system of clause 11, wherein the one or more fire protection devices comprise an initiating device or a notification device.

13. The fire protection system of clauses 11 or 12, wherein the one or more fire protection devices comprise a strobe, a self-amplified speaker, an emergency signage, a smoke detector, or a sounder.

14. The fire protection system of any one of the above clauses, wherein the second transceiver is located distant from the first transceiver.

15. The fire protection system of any one of the above clauses, further comprising a ground fault detection circuit configured to detect a ground fault using the power from the first power source.

16. The fire protection system of clause 15, wherein the ground fault detection circuit is collocated with the first transceiver.

17. The fire protection system of any one of the above clauses, wherein the communication link comprises a twisted pair of wires.

17-1. The fire protection system of any one of the above clauses, wherein the isolator comprises a transformer.

18. The fire protection system of any one of the above clauses, wherein each one of the first transceiver and the second transceiver comprises a differential signaling transceiver.

19. An apparatus in a fire protection system, comprising:

a first transceiver communicatively coupled with a first end of a communication link and configured to communicate a signal with a second transceiver coupled with a second end of the communication link; and a coupling/decoupling circuit configured to provide overlayed power by overlaying power from a first power source onto the signal at the first end of the communication link, wherein the overlayed power is configured to power the second transceiver at the second end of the communication link.

20. An apparatus in a fire protection system, comprising:

a first transceiver communicatively coupled with a first end of a communication link and configured to communicate a signal with a second transceiver communicatively coupled with a second end of the communication link; and a coupling/decoupling circuit configured to provide separated power by separating the signal from power overlayed onto the communication link, wherein the separated power is configured to power the first transceiver.

Figure 6:
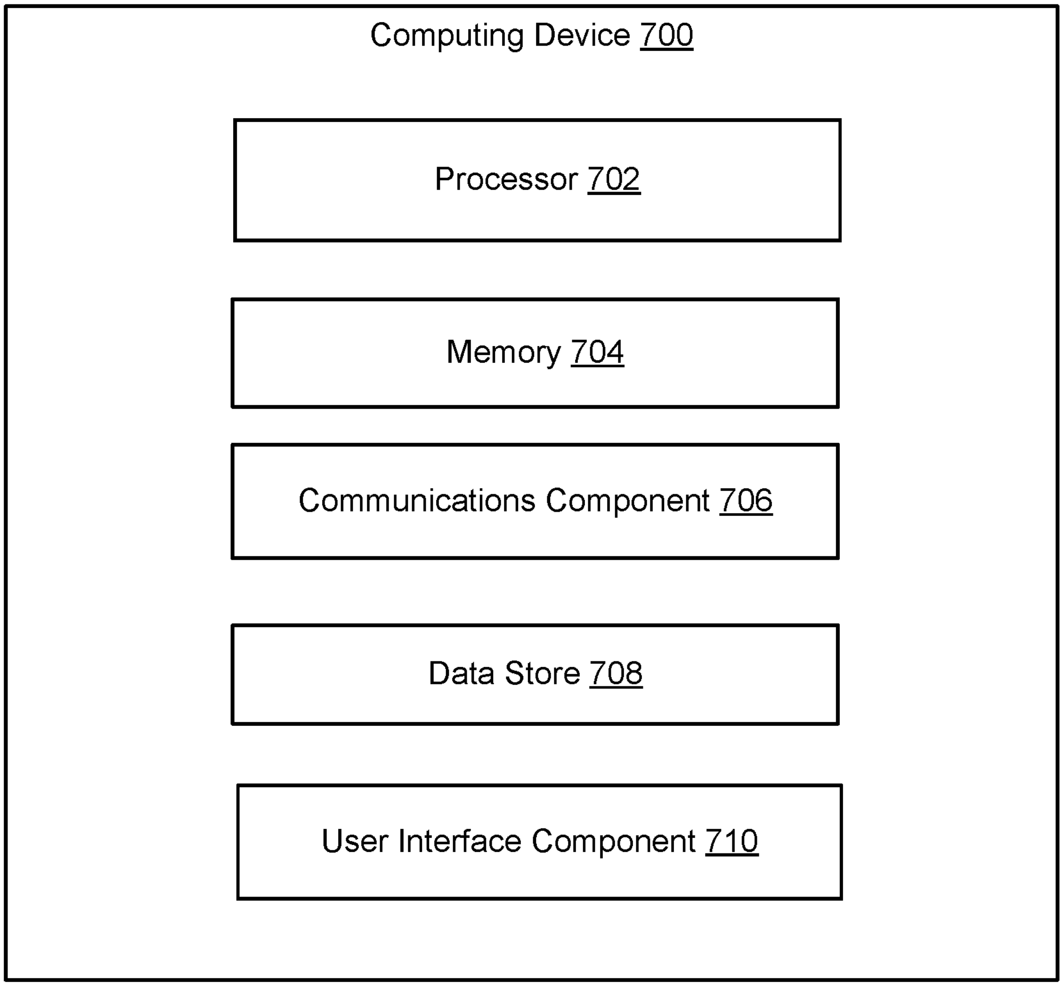
FIG. 6 is a block diagram of an example computing device which may implement a component in the fire protection system of FIG. 1-3 or 5, according to an aspect of the present disclosure.

Referring to FIG. 6, a computing device 700 may implement all or a portion of the functionality described in FIGS. 1-5 above. For example, the computing device 700 may be or may include at least a portion of the first fire protection equipment box 110, the second fire protection equipment box 112, the first UI 102, the second UI 118, the first processor 104, the second processor 121, or any other component described herein with reference to FIGS. 1-5 above. The computing device 700 includes a processor 702 which may be configured to execute or implement software, hardware, and/or firmware modules that perform any functionality described herein with reference to FIGS. 1-6 above. For example, the processor 702 may be configured to execute or implement software, hardware, and/or firmware modules that performs any functionality described herein with reference to the first fire protection equipment box 110, the second fire protection equipment box 112, the first UI 102, the second UI 118, the first processor 104, the second processor 121, or any other component/system/device described herein with reference to FIGS. 1-5 above.

The processor 702 may be a micro-controller, an application-specific integrated circuit (ASIC), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, etc., and/or other components of the computing device 700.

Further, the computing device 700 may include a communications component 706 that provides for establishing and maintaining communications with one or more other devices, parties, entities, etc., utilizing hardware, software, and services. The communications component 706 may carry communications between components on the computing device 700, as well as between the computing device 700 and external devices, such as devices located across a communications network and/or devices serially or locally coupled with the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A fire protection system, comprising:

a first fire alarm control panel comprising a first transceiver communicatively coupled with a first end of a communication link;

a second fire alarm control panel comprising a second transceiver communicatively coupled with a second end of the communication link and configured for communicating a signal with the first transceiver via the communication link;

a first coupling/decoupling circuit in the first fire alarm control panel, the first coupling/decoupling circuit being configured to provide overlayed power by overlaying power from a first power source in the first fire alarm control panel onto the signal at the first end of the communication link; and a second coupling/decoupling circuit in the second fire alarm control panel, the second coupling/decoupling circuit being configured to provide separated power by separating the signal from the overlayed power at the second end of the communication link, wherein the separated power is configured to power the second transceiver in the second fire alarm control panel.

2. The fire protection system of claim 1, wherein the first coupling/decoupling circuit is configured to capacitively couple a signal port of the first transceiver to the communication link, and wherein the first coupling/decoupling circuit is configured to inductively couple the first power source to the communication link.

3. The fire protection system of claim 1, wherein the second coupling/decoupling circuit is configured to capacitively decouple a signal port of the second transceiver from the communication link, and wherein the second coupling/decoupling circuit is configured to inductively decouple the separated power from the communication link.

4. The fire protection system of claim 1, further comprising an isolator in the second fire alarm control panel, the isolator being communicatively coupled with the second transceiver and configured for communicating the signal with the second transceiver.

5. The fire protection system of claim 4,
wherein the isolator comprises a first side and a second side, and
wherein the isolator is configured to provide an isolation barrier between the first side and the second side.

6. The fire protection system of claim 5,
wherein the first side of the isolator is communicatively coupled with the second transceiver in the second fire alarm control panel, and
wherein the second side of the isolator is communicatively coupled with a processor in the second fire alarm control panel.

7. The fire protection system of claim 6, wherein the separated power is configured to power the first side of the isolator.

8. The fire protection system of claim 7, wherein a second power source is configured to power the processor and the second side of the isolator.

9. The fire protection system of claim 1,
wherein the second transceiver is communicatively coupled with a processor in the second fire alarm control panel, and
wherein the separated power is further configured to power the processor in the second fire alarm control panel.

10. The fire protection system of claim 9, wherein the separated power is further configured to power one or more devices that are controlled by the processor in the second fire alarm control panel.

11. The fire protection system of claim 10, wherein the one or more devices comprise one or more fire protection devices controlled by the processor in the second fire alarm control panel.

12. The fire protection system of claim 11, wherein the one or more fire protection devices comprise an initiating device or a notification device.

13. The fire protection system of claim 11, wherein the one or more fire protection devices comprise a strobe, a self-amplified speaker, an emergency signage, a smoke detector, or a sounder.

14. The fire protection system of claim 1, wherein the first fire alarm control panel is located distant from the second fire alarm control panel comprising.

15. The fire protection system of claim 1, further comprising a ground fault detection circuit configured to detect a ground fault using the power from the first power source.

16. The fire protection system of claim 15, wherein the ground fault detection circuit is collocated with the first transceiver in the first fire alarm control panel.

17. The fire protection system of claim 1, wherein the communication link comprises a twisted pair of wires.

18. The fire protection system of claim 1, wherein each one of the first transceiver and the second transceiver comprises a differential signaling transceiver.

19. An apparatus in a fire protection system, comprising:
a first fire alarm control panel comprising a first transceiver communicatively coupled with a first end of a communication link and configured to communicate a signal with a second transceiver in a second fire alarm control panel, the second transceiver being coupled with a second end of the communication link; and
a coupling/decoupling circuit configured to provide overlayed power by overlaying power from a first power source in the first fire alarm control panel onto the signal at the first end of the communication link,
wherein the overlayed power is configured to power the second transceiver at the second end of the communication link.

20. An apparatus in a fire protection system, comprising:
a first fire alarm control panel comprising a first transceiver communicatively coupled with a first end of a communication link and configured to communicate a signal with a second transceiver in a second fire alarm control panel, the second transceiver being communicatively coupled with a second end of the communication link; and
a coupling/decoupling circuit configured to provide separated power by separating the signal from power overlayed onto the communication link,
wherein the separated power is configured to power the first transceiver.

21. The fire protection system of claim 11, wherein the one or more fire protection devices comprise a smoke detector controlled by the processor in the second fire alarm control panel.

* * * * *